(12) United States Patent
Li et al.

(10) Patent No.: US 9,781,614 B2
(45) Date of Patent: Oct. 3, 2017

(54) TRANSMISSION METHOD FOR NETWORK MANAGEMENT CONTROL INFORMATION AND MICROWAVE DEVICE

(71) Applicant: Huawei Technologies Co., Ltd., Shenzhen, Guangdong (CN)

(72) Inventors: Kun Li, Chengdu (CN); Yi Chen, Chengdu (CN); Hao Long, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/196,833

(22) Filed: Jun. 29, 2016

(65) Prior Publication Data

US 2016/0309349 A1 Oct. 20, 2016

Related U.S. Application Data

(63) Continuation of application No. PCT/CN2013/091205, filed on Dec. 31, 2013.

(51) Int. Cl.
| | |
|---|---|
| *H03C 1/52* | (2006.01) |
| *H04L 27/04* | (2006.01) |
| *H04W 24/02* | (2009.01) |
| *H04L 27/02* | (2006.01) |
| *H04L 27/18* | (2006.01) |
| *H04B 17/318* | (2015.01) |

(52) U.S. Cl.
CPC .......... *H04W 24/02* (2013.01); *H04B 17/318* (2015.01); *H04L 27/02* (2013.01); *H04L 27/04* (2013.01); *H04L 27/18* (2013.01)

(58) Field of Classification Search
CPC .... H04W 24/02; H04W 72/048; H04L 27/02; H04L 27/04; H04L 27/18
See application file for complete search history.

(56) References Cited

U.S. PATENT DOCUMENTS

| | | | | |
|---|---|---|---|---|
| 7,133,375 | B1 * | 11/2006 | Molla | ................... H04W 88/08 370/320 |
| 8,238,318 | B1 * | 8/2012 | Negus | ................... H04W 84/12 370/310 |

(Continued)

FOREIGN PATENT DOCUMENTS

| | | |
|---|---|---|
| CN | 101697500 A | 4/2010 |
| CN | 103187998 A | 7/2013 |

*Primary Examiner* — Shuwang Liu
*Assistant Examiner* — Sung Ahn

(57) ABSTRACT

The present invention relates to a transmission method for network management control information and a microwave device, where the method includes: receiving, by a first device, network management control information, where the network management control information is microwave parameter configuration information of a second device; generating, by the first device, a control signal according to the network management control information, and generating a to-be-sent radio frequency signal after baseband processing and radio frequency processing are performed on preset information; and performing, by the first device, modulation on the radio frequency signal by using the control signal, to obtain a parameter configuration signal, and sending the parameter configuration signal to the second device.

20 Claims, 8 Drawing Sheets

(56) References Cited

U.S. PATENT DOCUMENTS

| | | | | |
|---|---|---|---|---|
| 8,502,733 B1* | 8/2013 | Negus | ............... | H04W 4/00 |
| | | | | 342/350 |
| 2008/0032726 A1* | 2/2008 | Tajima | ............... | H04L 1/0003 |
| | | | | 455/509 |
| 2012/0164950 A1* | 6/2012 | Nentwig | ............... | H04W 28/18 |
| | | | | 455/63.1 |
| 2013/0279623 A1* | 10/2013 | Miyata | ............... | H04L 1/0001 |
| | | | | 375/285 |
| 2014/0155007 A1* | 6/2014 | Rofougaran | ............... | H04B 1/40 |
| | | | | 455/115.1 |
| 2014/0241168 A1* | 8/2014 | Merlin | ............... | H04L 1/0003 |
| | | | | 370/241 |
| 2015/0382229 A1* | 12/2015 | Bhandari | ............... | H04W 28/0236 |
| | | | | 370/238 |

* cited by examiner

TRANSMISSION METHOD FOR NETWORK MANAGEMENT CONTROL INFORMATION AND MICROWAVE DEVICE

CROSS-REFERENCE TO RELATED APPLICATIONS

This application is a continuation of International Application No. PCT/CN2013/091205, filed on Dec. 31, 2013, which is hereby incorporated by reference in its entirety.

TECHNICAL FIELD

The present invention relates to communications technologies, and in particular, to a transmission method for network management control information and a microwave device.

BACKGROUND

A microwave communication technology is a mainstream large-capacity radio communication technology currently and is one of most promising communication means due to its low costs, fast deployment, high-quality transmission, and strong anti-disaster ability. At present, one of main development directions of the microwave communication technology is to further reduce manpower input and time consumption for microwave device installation and deployment and to reduce impact imposed by mobile network deployment on public life. When a microwave link is established between devices on two sides, parameters need to be configured for the microwave devices according to network management control information, to ensure that parameters, such as working frequencies, bandwidths, and modulation schemes, of the devices on the two sides are matched. Only in this way can the devices on the two sides communicate properly.

In the prior art, an engineering team needs to enter a site A at which a microwave device A is located and a site B at which a microwave device B is located, and input, by using a network management configuration device, network management control information to the microwave A and the microwave B, to configure a parameter. This method of configuring a parameter has low efficiency.

SUMMARY

The present invention provides a transmission method for network management control information and a microwave device, which are used to resolve a problem in the prior art that efficiency of configuring a parameter for a microwave device is low.

A first aspect of the present invention provides a transmission method for network management control information, where the method includes:

receiving, by a first device, network management control information, where the network management control information is microwave parameter configuration information of a second device;

generating, by the first device, a control signal according to the network management control information, and generating a to-be-sent radio frequency signal after baseband processing and radio frequency processing are performed on preset information; and performing, by the first device, modulation on the radio frequency signal by using the control signal, to obtain a parameter configuration signal, and sending the parameter configuration signal to the second device.

In a first possible implementation manner, with reference to the first aspect, the performing, by the first device, modulation on the radio frequency signal by using the control signal specifically includes:

performing, by the first device, adjustment processing on an amplitude and/or a phase of the radio frequency signal according to the control signal, to change power of the radio frequency signal.

In a second possible implementation manner, with reference to the first possible implementation manner, the performing, by the first device, adjustment processing on an amplitude of the radio frequency signal according to the control signal specifically includes:

adjusting, by the first device, an amplitude of the parameter configuration signal according to the control signal by using on-off-keying (OOK) or amplitude shift keying (ASK).

In a third possible implementation manner, with reference to the first possible implementation manner, the performing, by the first device, adjustment processing on a phase of the radio frequency signal according to the control signal specifically includes:

adjusting, by the first device, a phase of the parameter configuration signal according to the control signal by using phase-shift keying (PSK).

A second aspect of the present invention provides a transmission method for network management control information, where the method includes:

receiving, by a second device, a parameter configuration signal sent by a first device, where the parameter configuration signal is obtained after the first device performs modulation on a radio frequency signal by using a control signal;

detecting, by the second device, at least one of an amplitude and/or a phase of the parameter configuration signal to obtain the control signal corresponding to the parameter configuration signal; and acquiring, by the second device, network management control information corresponding to the control signal, where the network management control information is microwave parameter configuration information of the second device.

In a first possible implementation manner, with reference to the second aspect, the detecting, by the second device, an amplitude of the parameter configuration signal to obtain the control signal corresponding to the parameter configuration signal specifically includes:

detecting, by the second device, the amplitude of the parameter configuration signal to obtain a signal strength indication signal, performing, by the second device, sampling and quantization processing on the signal strength indication signal to obtain a first quantization signal, and performing, by the second device, demodulation on an amplitude of the first quantization signal to obtain the control signal; and/or the detecting, by the second device, a phase of the parameter configuration signal to obtain the control signal corresponding to the parameter configuration signal specifically includes:

detecting, by the second device, the phase of the parameter configuration signal to obtain a signal phase indication signal, performing, by the second device, sampling and quantization processing on the signal phase indication signal to obtain a second quantization signal, and performing, by the second device, demodulation on a phase of the second quantization signal to obtain the control signal.

In a second possible implementation manner, with reference to the first possible implementation manner, the performing, by the second device, demodulation on an amplitude of the first quantization signal to obtain the control signal specifically includes:

performing, by the second device, demodulation on the amplitude of the first quantization signal by using on-off-keying (OOK) or amplitude shift keying (ASK), to obtain the control signal.

In a third possible implementation manner, with reference to the first possible implementation manner, the performing, by the second device, demodulation on a phase of the second quantization signal to obtain the control signal specifically includes:

performing, by the second device, demodulation on the phase of the second quantization signal by using phase-shift keying (PSK), to obtain the control signal.

A third aspect of the present invention provides a microwave device, where the microwave device includes:

a receiving module, configured to receive network management control information, where the network management control information is microwave parameter configuration information of a second device;

a generation module, configured to generate a control signal according to the network management control information, and generate a to-be-sent radio frequency signal after baseband processing and radio frequency processing are performed on preset information;

a modulation module, configured to perform modulation on the radio frequency signal by using the control signal, to obtain a parameter configuration signal; and a sending module, configured to send the parameter configuration signal to the second device.

In a first possible implementation manner, with reference to the third aspect, the modulation module is specifically configured to:

perform adjustment processing on an amplitude and/or a phase of the radio frequency signal according to the control signal, to change power of the radio frequency signal.

In a second possible implementation manner, with reference to the first possible implementation manner, the modulation module is specifically configured to:

adjust an amplitude of the parameter configuration signal according to the control signal by using on-off-keying (OOK) or amplitude shift keying (ASK).

In a third possible implementation manner, with reference to the first possible implementation manner, the modulation module is specifically configured to:

adjust a phase of the parameter configuration signal according to the control signal by using phase-shift keying (PSK).

A fourth aspect of the present invention provides a microwave device, where the microwave device includes:

a receiving module, configured to receive a parameter configuration signal sent by a first device, where the parameter configuration signal is obtained after the first device performs modulation on a radio frequency signal by using a control signal;

a detection module, configured to detect at least one of an amplitude and/or a phase of the parameter configuration signal to obtain the control signal corresponding to the parameter configuration signal; and an acquiring module, configured to acquire network management control information corresponding to the control signal, where the network management control information is microwave parameter configuration information of the second device.

In a first possible implementation manner, with reference to the first aspect, the detection module is specifically configured to:

detect the amplitude of the parameter configuration signal to obtain a signal strength indication signal, perform sampling and quantization processing on the signal strength indication signal to obtain a first quantization signal, and perform demodulation on an amplitude of the first quantization signal to obtain the control signal; and/or the detection module is specifically configured to:

detect the phase of the parameter configuration signal to obtain a signal phase indication signal, perform sampling and quantization processing on the signal phase indication signal to obtain a second quantization signal, and perform demodulation on a phase of the second quantization signal to obtain the control signal.

In a second possible implementation manner, with reference to the first possible implementation manner, the detection module is specifically configured to:

perform demodulation on the amplitude of the first quantization signal by using on-off-keying (OOK) or amplitude shift keying (ASK), to obtain the control signal.

In a third possible implementation manner, with reference to the first possible implementation manner, the detection module is specifically configured to:

perform demodulation on the phase of the second quantization signal by using phase-shift keying (PSK), to obtain the control signal.

According to the transmission method for network management control information and the microwave device in the embodiments of the present invention, a first device receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device; and the second device obtains, after receiving the parameter configuration signal, the control signal by detecting strength of the received signal, and then obtains the network management control information from the first device. In this way, efficiency of configuring a parameter for a microwave device is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
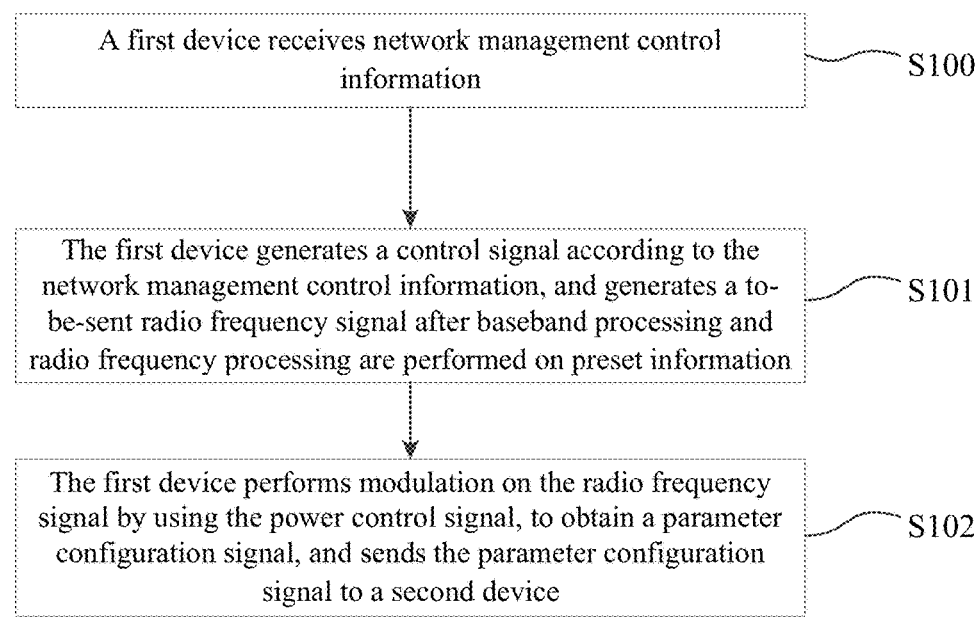
FIG. 1 is a flowchart of a transmission method for network management control information according to Embodiment 1 of the present invention.

FIG. 1 is a flowchart of a transmission method for network management control information according to Embodiment 1 of the present invention. As shown in FIG. 1, the method includes the following steps:

Step S100: A first device receives network management control information.

Step S101: The first device generates a control signal according to the network management control information, and generates a to-be-sent radio frequency signal after baseband processing and radio frequency processing are performed on preset information.

Step S102: The first device performs modulation on the radio frequency signal by using the control signal, to obtain a parameter configuration signal, and sends the parameter configuration signal to a second device.

In this embodiment, the steps are executed by the first device. In practice, both the first device and the second device may be microwave devices, for which parameter configuration has not been completed, on a microwave network.

After the first device receives the network management control information, the second device may obtain the network management control information according to the foregoing steps provided in this embodiment, to implement parameter configuration for the second device.

Specifically, the first device first receives the network management control information from a network management system, where the network management control information is microwave parameter configuration information of the second device; and the second device may perform microwave parameter configuration according to the network management control information.

The network management control information may be a binary bit stream and may be directly sent to the first device by using a computer.

After receiving the network management control information, the first device may generate the control signal by using the network management control information.

When generating the control signal, in a feasible implementation manner, the first device may encapsulate the network management control information, for example, performing an operation of adding a check code to improve accuracy of signal transmission, to form the control signal; in another feasible implementation manner, the first device may directly use the network management control information as the control signal.

When generating the to-be-sent radio frequency signal, the first device may perform baseband processing and radio frequency processing on the preset information, to generate the to-be-sent radio frequency signal. The preset information may be any binary bit stream or may be the network management control information. Specifically, a manner for performing baseband signal processing on the preset information is the same as a manner for performing baseband processing on a binary bit stream in the prior art. For example, a scrambling sequence is used to scramble the preset sequence, then baseband modulation is performed by using a scheme such as quadrature phase shift keying (QPSK) or quadrature amplitude modulation (QAM), and then radio frequency processing is performed on a baseband signal on which the baseband modulation has been performed, that is, the baseband signal on which the baseband modulation has been performed is up-converted to a radio frequency carrier, to form the to-be-sent radio frequency signal. After the first device generates the control signal and the to-be-sent radio frequency signal, the first device may perform modulation on the radio frequency signal by using the control signal, to form the parameter configuration signal, so that the second device may obtain, by detecting the parameter configuration signal, the network management control information sent by the first device.

In a feasible implementation manner, the control signal is a binary bit stream generated according to the network management control information, and therefore, the first device may modulate an amplitude or a phase of the radio frequency signal by using the control signal, or may modulate both an amplitude and a phase of the radio frequency signal by using the control signal. Specifically, the first device may modulate the amplitude of the radio frequency signal by using on-off-keying (OOK) or amplitude shift keying (ASK), or modulate the phase of the radio frequency signal by using phase-shift keying (PSK), or modulate the amplitude and the phase of the radio frequency signal by using a combination manner of ASK and PSK, so that the second device may obtain, by means of detection according to the amplitude or the phase or both the amplitude and the phase of the received parameter configuration signal, the control signal corresponding to the parameter configuration signal, and then obtain the corresponding network management control information according to the control signal, to complete parameter configuration for the second device according to the network management control information.

It should be noted that, in practice, an operation, administration and maintenance (OAM) processing module may be added in a microwave device to implement the foregoing three steps in a software manner; or a hardware circuit in a microwave device may be used to implement the foregoing steps; or a combination manner of software and hardware may be used to implement the foregoing three steps. Costs of performing processing on the radio frequency signal are lower by using an amplitude modulation scheme, while performance of performing processing on the radio frequency signal is better by using a phase modulation scheme; therefore, in practice, modulation may be performed on the radio frequency signal by selecting a different method according to an actual requirement.

In the foregoing embodiment, a first device first receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device, so that the second device obtains, after receiving the parameter configuration signal, the control signal by detecting at least one of an amplitude, or a phase, or an amplitude and a phase of the received signal, and then obtains the network management control information from the first device. In this way, efficiency of configuring a parameter for a microwave device is improved.

Figure 2:
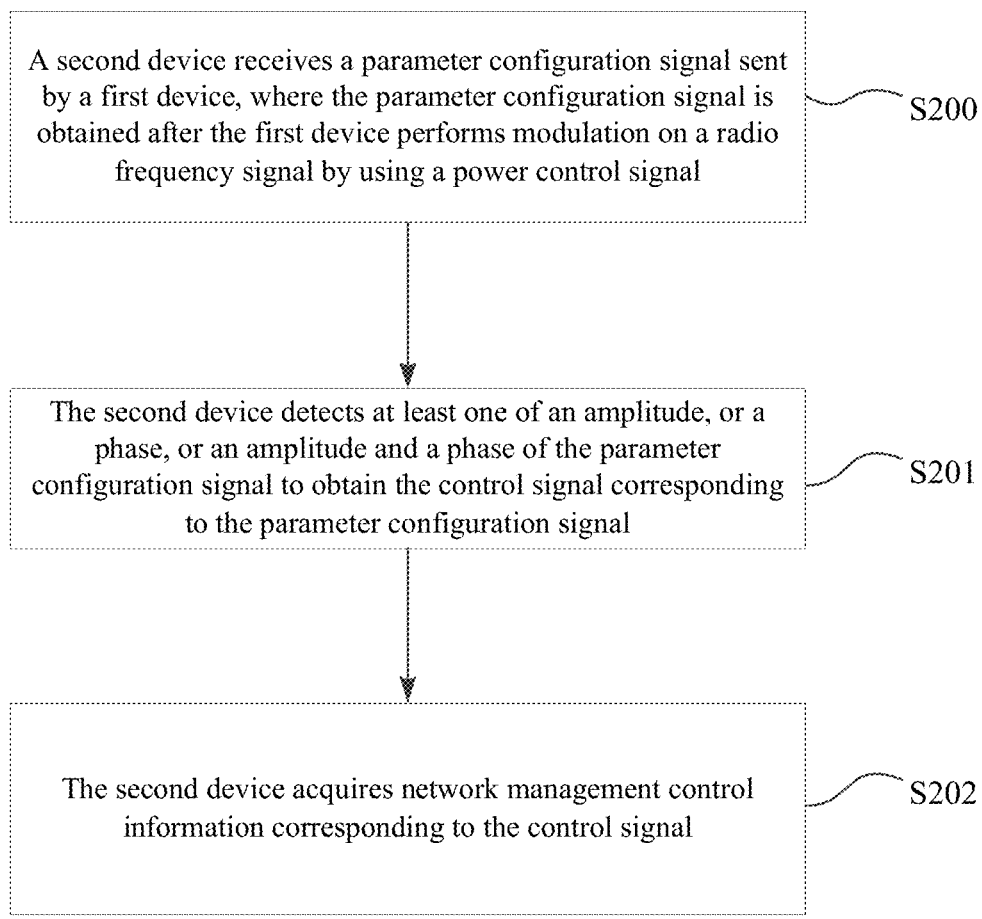
FIG. 2 is a flowchart of a transmission method for network management control information according to Embodiment 2 of the present invention.

FIG. 2 is a flowchart of a transmission method for network management control information according to Embodiment 2 of the present invention. As shown in FIG. 2, the method includes the following steps:

Step S200: A second device receives a parameter configuration signal sent by a first device, where the parameter configuration signal is obtained after the first device performs modulation on a radio frequency signal by using a control signal.

Step S201: The second device detects at least one of an amplitude, or a phase, or an amplitude and a phase of the parameter configuration signal to obtain the control signal corresponding to the parameter configuration signal.

Step S202: The second device acquires network management control information corresponding to the control signal.

In this embodiment, the steps are executed by the second device. In practice, the first device and the second device may be microwave devices, for which parameter configuration has not been completed, on a microwave network.

In this embodiment, the second device receives the parameter configuration signal from the first device, then obtains, by detecting at least one of the amplitude, or the phase, or the amplitude and the phase of the parameter configuration signal, the control signal corresponding to the parameter configuration signal, and then obtains, according to the control signal, the network management control information corresponding to the control signal. The network management control information is microwave parameter configuration information of the second device, and therefore, the second device may perform microwave parameter configuration according to the network management control information.

Specifically, the second device first receives the parameter configuration signal sent by the first device. It should be noted that, the parameter configuration signal herein is not a parameter configuration signal directly generated by the first device, but is a signal that reaches the second device after the parameter configuration signal of the first device is transmitted over a channel, and therefore, the signal may include noise and interference.

The parameter configuration signal that is from the first device and received by the second device is obtained after modulation is performed on the radio frequency signal by using the control signal, and therefore, the second device may obtain, by detecting the parameter configuration signal, the control signal corresponding to the parameter configuration signal.

Specifically, the second device may detect at least one of the amplitude, or the phase, or the amplitude and the phase of the parameter configuration signal to obtain at least one of a signal strength indication signal, or a signal phase indication signal, or a signal strength indication signal and a signal phase indication signal, where the signal strength indication signal, or the signal phase indication signal, or the signal strength indication signal and the signal phase indication signal are corresponding to the parameter configuration signal. Processing on the signal strength indication signal or on the signal phase indication signal is used as an example for a detailed description in the following. When the signal strength indication signal and the signal phase indication signal are obtained, processing only needs to be performed according to their respective processing methods.

Specifically, the parameter configuration signal from the first device is an analog signal, and therefore, the second device needs to perform sampling and quantization processing on the signal strength indication signal to obtain a first quantization signal, or may perform sampling and quantization processing on the signal phase indication signal to obtain a second quantization signal. Then, the second device may obtain the control signal corresponding to the signal strength indication signal or the signal phase indication signal by performing amplitude demodulation on the first quantization signal or by performing phase demodulation on the second quantization signal.

Further, if the first device modulates an amplitude of the radio frequency signal by using OOK or ASK, the second device performs amplitude demodulation on the quantization signal by using the OOK or the ASK; if the first device modulates a phase of the radio frequency signal by using PSK, the second device performs phase demodulation on the quantization signal by using the PSK; if the first device modulates an amplitude and a phase of the radio frequency signal by using a combination manner of ASK and PSK, the second device performs amplitude and phase demodulation on the quantization signal by using the combination manner of ASK and PSK.

After the second device obtains the control signal corresponding to the signal strength indication signal or the signal phase indication signal, the second device may obtain the network management control information according to the control signal. Specifically, if the first device obtains the control signal by encapsulating the network management control information, for example, by performing an operation of adding a check code, the second device may obtain the network management control information by performing decapsulation on the control signal, for example, by performing an operation of decoding the check code.

It should be noted that, in practice, an operation, administration and maintenance (OAM) processing module may be added in a microwave device to implement the foregoing three steps. In addition, in practice, the first device may send the parameter configuration signal repeatedly, and the second device may perform soft-bit merging on the parameter configuration signals that are received multiple times, to improve accuracy of acquiring the network management control information.

In the foregoing embodiment, a first device first receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device, so that the second device obtains, after receiving the parameter configuration signal, the control signal by detecting at least one of an amplitude, or a phase, or an amplitude and a phase of the received signal, and then obtains the network management control information from the first device. In this way, efficiency of configuring a parameter for a microwave device is improved.

Figure 3:
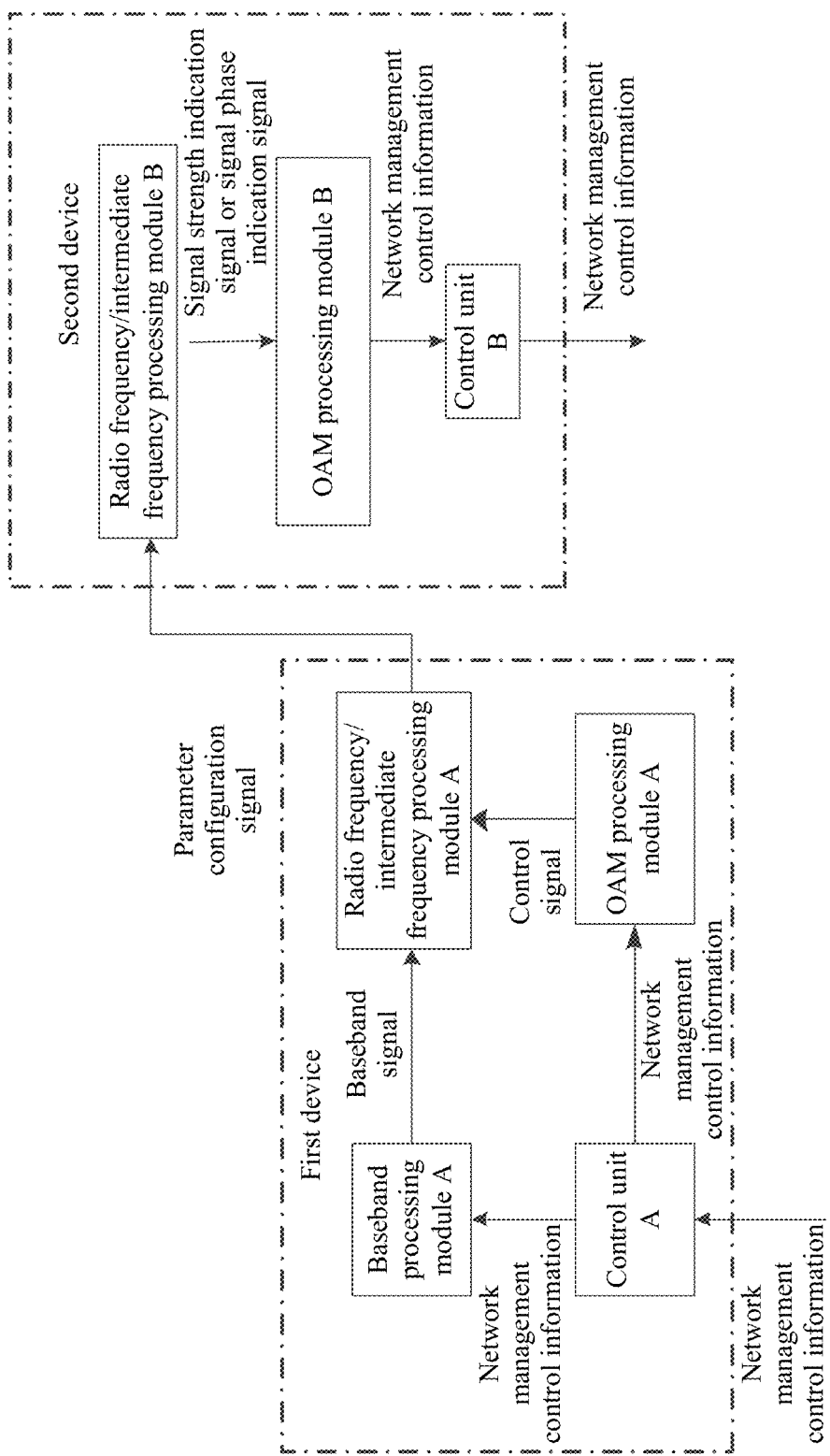
FIG. 3 is a schematic diagram of network management control information transmission implemented by means of interaction between a first device and a second device according to Embodiment 3 of the present invention.

FIG. 3 is a schematic diagram of network management control information transmission implemented by means of interaction between a first device and a second device according to Embodiment 3 of the present invention. As shown in FIG. 3, in practice, the first device may include: a baseband processing module A, a radio frequency/intermediate frequency processing module A, a control unit A, and an OAM processing module A; the second device may include: a radio frequency/intermediate frequency processing module B, a control unit B, and an OAM processing module B.

The control unit A receives network management control information, and outputs the network management control information to the baseband processing module A and the OAM processing module. The baseband processing module A receives the network management control information output by the control unit A, performs baseband processing on the network management control information, for example, performing baseband operations of data framing and code modulation, and sends a processed baseband signal to the radio frequency/intermediate frequency processing module A. The OAM processing module A first encapsulates the received network management control information to obtain a control signal, and then outputs the control signal to the radio frequency/intermediate frequency processing module A. The radio frequency/intermediate frequency processing module A performs up-conversion on the baseband signal to modulate the baseband signal to a radio frequency carrier, to form a radio frequency signal, performs modulation on the radio frequency signal according to the control signal output by the OAM processing module A, to form a final parameter configuration signal, and sends the final parameter configuration signal to the second device by using a radio frequency antenna. The radio frequency/intermediate frequency processing module B of the second device receives the parameter configuration signal sent by the first device, detects a signal strength indication signal or a signal phase indication signal of the parameter configuration signal, and outputs the signal strength indication signal or the signal phase indication signal to the OAM processing module B. The OAM processing module B detects the received signal strength indication signal or the received signal phase indication signal to obtain the control signal, and further obtains the network management control information by means of decapsulation according to the control signal, and outputs the network management control information to the control unit B. Then the control unit B outputs the information.

It should be noted that, in the modules of the first device and the second device, the OAM processing module A and the OAM processing module B are newly added modules in this embodiment, and the other modules are modules existing in the prior art, but have slightly different functions. In addition, a working frequency of a radio frequency is extremely high in practice, and therefore, up-conversion generally needs to be performed on a baseband signal twice, where the baseband signal is first up-converted to an intermediate frequency, and then is up-converted to a radio frequency. Therefore, radio frequency/intermediate frequency processing modules are used herein.

Specifically, the OAM processing module A is configured to implement the following steps S300 and S301, and step S302, and the OAM processing module B is configured to implement the following steps S303 to S305. The foregoing modules implement the following steps in a software manner. In practice, a hardware circuit in a microwave device may also be used to implement the foregoing steps, or a combination manner of software and hardware may be used to implement the following three steps.

A process of interaction between the first device and the second device is as follows:

Step S300: The first device receives network management control information.

This step is executed by the first device. In practice, the first device may be a microwave device, for which parameter configuration has not been completed, on a microwave network. This step may be implemented by the OAM processing module A.

Specifically, the first device may receive the network management control information, where the information may be a binary bit stream sent by a computer, and the network control information carries working parameters, such as a working frequency of a radio frequency, a working bandwidth of the radio frequency, and a baseband modulation scheme, of the first device. Any microwave device can complete working parameter configuration according to the network management control information.

Step S301: The first device generates a control signal according to the network management control information, and generates a to-be-sent radio frequency signal after baseband processing and radio frequency processing are performed on preset information.

This step is executed by the first device. In practice, the first device may be a microwave device, for which parameter configuration has not been completed, on a microwave network.

Specifically, after receiving the network management control information, the first device generates the control signal according to the network management control information, and generates the to-be-sent radio frequency signal after the baseband processing and radio frequency processing are performed on the preset information.

This step may include the following:

(1) The first device generates the control signal according to the network management control information.

Specifically, the first device may directly use the network management control information as the control signal, or may perform an encapsulation operation on the network management control information to generate the control signal. In practice, the foregoing encapsulation operation may be: adding a check code to the network management control information, such as a cyclic redundancy code (CRC), to improve accuracy of signal transmission. This step may be implemented by the OAM processing module A.

(2) The first device generates the to-be-sent radio frequency signal after the baseband processing and radio frequency processing are performed on the preset information.

Specifically, the first device first performs the baseband signal processing on the preset information, and then modulates the baseband signal to a radio frequency carrier, to form the to-be-sent radio frequency signal. During an actual operation, the first device may generate a binary bit stream randomly and use the binary bit stream as the preset information, or may use the network management control information as the preset information; then performs code modulation on the preset information to form the baseband signal; and then performs up-conversion processing on the modulated baseband signal to modulate the modulated baseband signal to the radio frequency carrier, to form the radio frequency signal. This step may be implemented by the baseband processing module A and the radio frequency/intermediate frequency processing module A.

Step S302: The first device performs modulation on the radio frequency signal by using the control signal, to obtain a parameter configuration signal, and sends the parameter configuration signal to the second device.

This step is executed by the first device. In practice, the first device and the second device may be microwave devices, for which parameter configuration has not been completed, on a microwave network.

The second device does not know the parameters, such as the working frequency of the radio frequency, the working bandwidth of the radio frequency, and the baseband modulation scheme of the first device. Therefore, if the first device directly sends the radio frequency signal to the second device, corresponding inverse processing for obtaining the network management control information cannot be performed on the received radio frequency signal by the second device. In this case, the first device may perform modulation on the to-be-sent radio frequency signal by using the control signal, to form the parameter configuration signal, so that the second device may obtain, by detecting the parameter configuration signal, the network management control information sent by the first device.

Specifically, the control signal is a binary bit stream generated according to the network management control information, and therefore, the first device may perform, according to the control signal, adjustment processing on an amplitude, or a phase, or both an amplitude and a phase of the radio frequency signal. This step may be implemented by the radio frequency/intermediate frequency processing module A.

In a feasible implementation manner, the first device may perform amplitude adjustment processing on the radio frequency signal by using an OOK or ASK scheme. Specifically, the OOK scheme means that the first device determines an amplitude of the parameter configuration signal according to each bit of the control signal. That is, when a sending bit of the control signal is 1, the first device uses the radio frequency signal as the parameter configuration signal, where a duration time of the radio frequency signal is the same as a duration time of the sending bit 1 of the control signal; when a sending bit of the control signal is 0, the first device does not send the parameter configuration signal, that is, the parameter configuration signal is zero, where a duration time of the radio frequency signal is the same as a duration time of the sending bit 0 of the control signal. Therefore, after the modulation has been performed by using OOK, the parameter configuration signal is actually a segment of intermittent signal, where when the sending bit of the control signal is 1, there is a signal; when the sending bit of the control signal is 0, there is no signal. Control signal and the ASK scheme mean that the first device may make, according to a selected ASK modulation scheme, different bit combinations of the control signal be corresponding to different amplitudes of the radio frequency signal. For example, if 4ASK modulation is used, for example, a bit combination 00 represents 1 volt, 01 represents 2 volts, 10 represents 3 volts, and 11 represents 4 volts, the first device may determine the amplitude of the parameter configuration signal according to a two-digit bit combination of the control signal. That is, when a sending bit of the control signal is 00, the amplitude of the radio frequency signal is adjusted to 1 volt and the radio frequency signal with the amplitude being adjusted to 1 volt is used as the parameter configuration signal, where a duration time of the radio frequency signal with the amplitude being adjusted to 1 volt is the same as a duration time of the sending bit 00 of the control signal; when a sending bit of the control signal is 01, the amplitude of the radio frequency signal is adjusted to 2 volts and the radio frequency signal with the amplitude being adjusted to 2 volts is used as the parameter configuration signal, where a duration time of the radio frequency signal with the amplitude being adjusted to 2 volts is the same as a duration time of the sending bit 01 of the control signal; when a sending bit of the control signal is 10, the amplitude of the radio frequency signal is adjusted to 3 volts and the radio frequency signal with the amplitude being adjusted to 3 volts is used as the parameter configuration signal, where a duration time of the radio frequency signal with the amplitude being adjusted to 3 volts is the same as a duration time of the sending bit 10 of the control signal; when a sending bit of the control signal is 11, the amplitude of the radio frequency signal is adjusted to 4 volts and the radio frequency signal with the amplitude being adjusted to 4 volts is used as the parameter configuration signal, where a duration time of the radio frequency signal with the amplitude being adjusted to 4 volts is the same as a duration time of the sending bit 11 of the control signal. Therefore, after the modulation has been performed by using ASK, the parameter configuration signal is actually an analog signal whose amplitude varies with a change of a bit stream of the control signal.

It should be noted that, 4ASK herein is only used as an example for description, and a specific ASK modulation scheme is not limited. 4ASK may be corresponding to four amplitudes, that is, corresponding to two-digit combinations; 8ASK may be corresponding to eight amplitudes, that is, corresponding to three-digit combinations; 16ASK may be corresponding to sixteen amplitudes, that is, corresponding to four-digit combinations; and the rest may be deduced by analogy. In practice, the first device may determine, according to an actually required transferring bit rate, which ASK modulation scheme is to be used.

In another feasible implementation manner, the first device may perform phase adjustment processing on the radio frequency signal by using a PSK scheme. Specifically, the first device determines a phase of the parameter configuration signal according to each bit of the control signal. That is, when a sending bit of the control signal is 0, the first device rotates the phase of the radio frequency signal, that is, the first device rotates the phase of the radio frequency signal by 180 degrees and uses the radio frequency signal with the phase being rotated as the parameter configuration signal, where a duration time of the radio frequency signal with the phase being rotated is the same as a duration time of the sending bit 0 of the control signal; when a sending bit of the control signal is 1, the first device does not change the phase of the radio frequency signal, and directly uses the radio frequency signal as the parameter configuration signal, where a duration time of the radio frequency signal with the phases being unchanged is the same as a duration time of the sending bit 1 of the control signal. Therefore, after the modulation has been performed by using PSK, the parameter configuration signal is actually an analog signal whose phase is rotated with a change of a bit stream of the control signal.

In another feasible implementation manner, the first device may perform amplitude and phase adjustment on the radio frequency signal by using a combination scheme of ASK and PSK. Specifically, the first device may make, according to a selected ASK modulation scheme, different bit combinations of the control signal be corresponding to different amplitudes and phases of the radio frequency signal. For example, if combination modulation of 4ASK and PSK is used, 4ASK may represent four different amplitudes, that is, corresponding to two-digit bits, and PSK may represent two different phases, that is, corresponding to one-digit bits; therefore, the combination modulation of 4ASK and PSK may represent eight different cases, that is, corresponding to three-digit bits. That is, for example, 000 represents that the amplitude of the radio frequency signal is adjusted to 1 volt and the phase of the radio frequency signal is rotated, where the radio frequency signal with the amplitude being adjusted to 1 volt and the phase being rotated is used as the parameter configuration signal and a duration time of the radio frequency signal with the amplitude being adjusted to 1 volt and the phase being rotated is the same as a duration time of a sending bit 000 of the control signal; 001 represents that the amplitude of the radio frequency signal is adjusted to 1 volt and the phase of the radio frequency signal is unchanged, where the radio frequency signal with the amplitude being adjusted to 1 volt and the phase being unchanged is used as the parameter configuration signal and a duration time of the radio frequency signal with the amplitude being adjusted to 1 volt and the phase being unchanged is the same as a duration time of a sending bit 001 of the control signal; 010 represents that the amplitude of the radio frequency signal is adjusted to 2 volts and the phase of the radio frequency signal is rotated, where the radio frequency signal with the amplitude being adjusted to 2 volts and the phase being rotated is used as the parameter configuration signal and a duration time of the radio frequency signal with the amplitude being adjusted to 2 volts and the phase being rotated is the same as a duration time of a sending bit 010 of the control signal; 100 represents that the amplitude of the radio frequency signal is adjusted to 2 volts and the phase of the radio frequency signal is unchanged, where the radio frequency signal with the amplitude being adjusted to 2 volts and the phase being unchanged is used as the parameter configuration signal and a duration time of the radio frequency signal with the amplitude being adjusted to 2 volts and the phase being unchanged is the same as a duration time of a sending bit 100 of the control signal; 011 represents that the amplitude of the radio frequency signal is adjusted to 3 volts and the phase of the radio frequency signal is rotated, where the radio frequency signal with the amplitude being adjusted to 3 volts and the phase being rotated is used as the parameter configuration signal and a duration time of the radio frequency signal with the amplitude being adjusted to 3 volts and the phase being rotated is the same as a duration time of a sending bit 011 of the control signal; 101 represents that the amplitude of the radio frequency signal is adjusted to 3 volts and the phase of the radio frequency signal is unchanged, where the radio frequency signal with the amplitude being adjusted to 3 volts and the phase being unchanged is used as the parameter configuration signal and a duration time of the radio frequency signal with the amplitude being adjusted to 3 volts and the phase being unchanged is the same as a duration time of a sending bit 101 of the control signal; 110 represents that the amplitude of the radio frequency signal is adjusted to 4 volts and the phase of the radio frequency signal is rotated, where the radio frequency signal with the amplitude being adjusted to 4 volts and the phase being rotated is used as the parameter configuration signal and a duration time of the radio frequency signal with the amplitude being adjusted to 4 volts and the phase being rotated is the same as a duration time of a sending bit 110 of the control signal; 111 represents that the amplitude of the radio frequency signal is adjusted to 4 volts and the phase of the radio frequency signal is unchanged, where the radio frequency signal with the amplitude being adjusted to 4 volts and the phase being unchanged is used as the parameter configuration signal and a duration time of the radio frequency signal with the amplitude being adjusted to 4 volts and the phase being unchanged is the same as a duration time of a sending bit 111 of the control signal. Therefore, after the modulation has been performed by using a combination of ASK and PSK, the parameter configuration signal is actually an analog signal whose phase is rotated with a change of a bit stream of the control signal and whose amplitude varies with the change of the bit stream of the control signal. In addition, a combination of OOK and PSK may also be used for modulation, but OOK can only represent sending a signal or represent not sending a signal, and therefore, when a sending bit of the control signal is 1, an operation of phase rotation or an operation of keeping a phase unchanged may be performed on the parameter configuration signal; however, when a sending bit of the control signal is 0, the parameter configuration signal is not sent in this case, and therefore, an operation of phase rotation or an operation of keeping a phase unchanged cannot be performed. Therefore, the combination of OOK and PSK may represent three different phases and amplitudes. The first case is that the radio frequency signal is used as the parameter configuration signal, where both the amplitude and the phase are unchanged; the second case is that the radio frequency signal is used as the parameter configuration signal, where the amplitude is unchanged and the phase is rotated; and the third case is that the radio frequency signal is not sent, that is, the parameter configuration signal is zero. However, the three cases cannot be corresponding to two-digit bits, and therefore, the combination modulation scheme of OOK and PSK is actually the same as the OOK modulation scheme in which only amplitude modulation is performed.

It should be noted that, an existing microwave device further provides a power control port in addition to a radio frequency transmit port, where the power control port is used to perform automatic transmit power control (ATPC). The ATPC power control means that, after a normal communications link is established between two microwave devices, power control is performed on an analog signal on a radio frequency transmit antenna by using signals from control units of the microwave devices, so that power of a transmit signal between the two devices keeps stable. In practice, before parameter configuration, the normal communications link has not been established between the two microwave devices, and therefore, the ATPC port may be used to implement power control of a radio frequency signal. After the normal link is established, this port may be switched back to power control in a normal working state.

Specifically, in this embodiment, a single-pole double-throw switch may be used to implement the foregoing function. The single-pole double-throw switch may be used to select a transmit control signal from the control unit A or the OAM processing module A of the first device. After the first device is initialized, the device enters a commissioning mode by default, and in this case, the single-pole double-throw switch selects the control signal from the OAM processing module A by default. Therefore, an ATPC input signal in this case is a control signal that is obtained by encapsulating network management control information, and after a communications link is established between two microwave devices, the switch may be switched to select a transmit control signal from the control units of the microwave devices.

Step S303: The second device receives the parameter configuration signal sent by the first device, where the parameter configuration signal is obtained after the first device performs modulation on the radio frequency signal by using the control signal.

This step is executed by the second device. In practice, the first device and the second device may be microwave devices, for which parameter configuration has not been completed, on a microwave network.

Specifically, the second device receives the parameter configuration signal sent by the first device. The parameter configuration signal is obtained after the first device performs modulation on the radio frequency signal by using the control signal, and therefore, the second device may obtain, by detecting at least one of an amplitude, or a phase, or an amplitude and a phase of the received parameter configuration signal, the network management control information that is carried by the parameter configuration signal. This step may be implemented by the radio frequency/intermediate frequency processing module B.

Step S304: The second device detects at least one of an amplitude, or a phase, or an amplitude and a phase of the parameter configuration signal to obtain the control signal corresponding to the parameter configuration signal.

This step is executed by the second device. In practice, the second device may be a microwave device, for which parameter configuration has not been completed, on a microwave network.

Specifically, this step may include the following:

(1) The second device detects at least one of the amplitude, or the phase, or the amplitude and the phase of the parameter configuration signal to obtain at least one of a signal strength indication signal, or a signal phase indication signal, or a signal strength indication signal and a signal phase indication signal.

Specifically, if the amplitude of the parameter configuration signal is detected, the signal strength indication signal corresponding to the parameter configuration signal may be obtained, where the signal strength indication signal reflects a change of the amplitude of the parameter configuration signal; if the phase of the parameter configuration signal is detected, the signal phase indication signal corresponding to the parameter configuration signal may be obtained, where the signal phase indication signal reflects a change of the phase of the parameter configuration signal; if the amplitude and the phase of the parameter configuration signal are detected, the signal strength indication signal and the signal phase indication signal may be obtained, that is, changes of both the amplitude and the phase of the parameter configuration signal may be detected. This step may be implemented by the radio frequency/intermediate frequency processing module B.

(2) The second device performs sampling and quantization processing on the signal strength indication signal or the signal phase indication signal to obtain a first quantization signal or a second quantization signal.

Specifically, the parameter configuration signal is an analog signal, and therefore, the signal strength indication signal or the signal phase indication signal, which is obtained by means of detection by the second device, is also an analog signal. To restore a digital signal, that is, the control signal, the second device may perform sampling on the analog signal to obtain a discrete signal, where the digital signal is carried in the analog signal; and then perform quantization processing on the signal obtained by means of sampling, to obtain the first quantization signal corresponding to the signal strength indication signal or the second quantization signal corresponding to the signal phase indication signal. This step may be implemented by the OAM processing module B.

It should be noted that, the parameter configuration signal that is from the first device and received by the second device is a signal that is transmitted over a channel, and noise and interference may also be caused at a receiver; therefore, optionally, the second device may perform filtering processing on the signal strength indication or the signal phase indication signal before the sampling or after the sampling, where an execution sequence is not limited herein, and then perform a quantization operation.

(3) The second device performs demodulation on at least one of the amplitude, or the phase, or the amplitude and the phase to obtain the control signal.

Specifically, after completing the quantization processing, the second device further needs to perform amplitude demodulation on the first quantization signal or perform phase demodulation on the second quantization signal, to obtain the control signal. When the first device modulates power of the radio frequency signal by using the control signal, OOK, or ASK, or PSK, or a combination manner of ASK and PSK may be used; and when performing demodulation, similarly, the second device needs to perform an inverse operation on the first quantization signal or the second quantization signal, that is, demodulation is performed on an amplitude of the first quantization signal according to the amplitude of the first quantization signal, or demodulation is performed on a phase of the second quantization signal according to the phase of the second quantization signal, or demodulation is performed on an amplitude of the first quantization signal and a phase of the second quantization signal according to the two quantization signals, to obtain the control signal. The foregoing operation of demodulating the amplitude or the phase, or demodulating both the amplitude and the phase is an inverse process of the modulation operation in step S302, and therefore, the operation only needs to be performed inversely herein, and a detailed operation description is similar, which is not repeatedly described herein. This step may be implemented by the OAM processing module B.

Step S305: The second device acquires the network management control information corresponding to the control signal.

This step is executed by the second device. In practice, the second device may be a microwave device, for which parameter configuration has not been completed, on a microwave network.

Specifically, if the first device directly uses the network management control information as the control signal, the second device does not need to perform the operation but directly uses the control signal as the network management control information; if the first device performs encapsulation on a network management control signal, for example, performing an operation of adding a check code, for example, adding a CRC code, the second device needs to perform an operation of decoding the check code on the control signal, to obtain the network management control information. This step may be implemented by the OAM processing module B.

Figure 4:
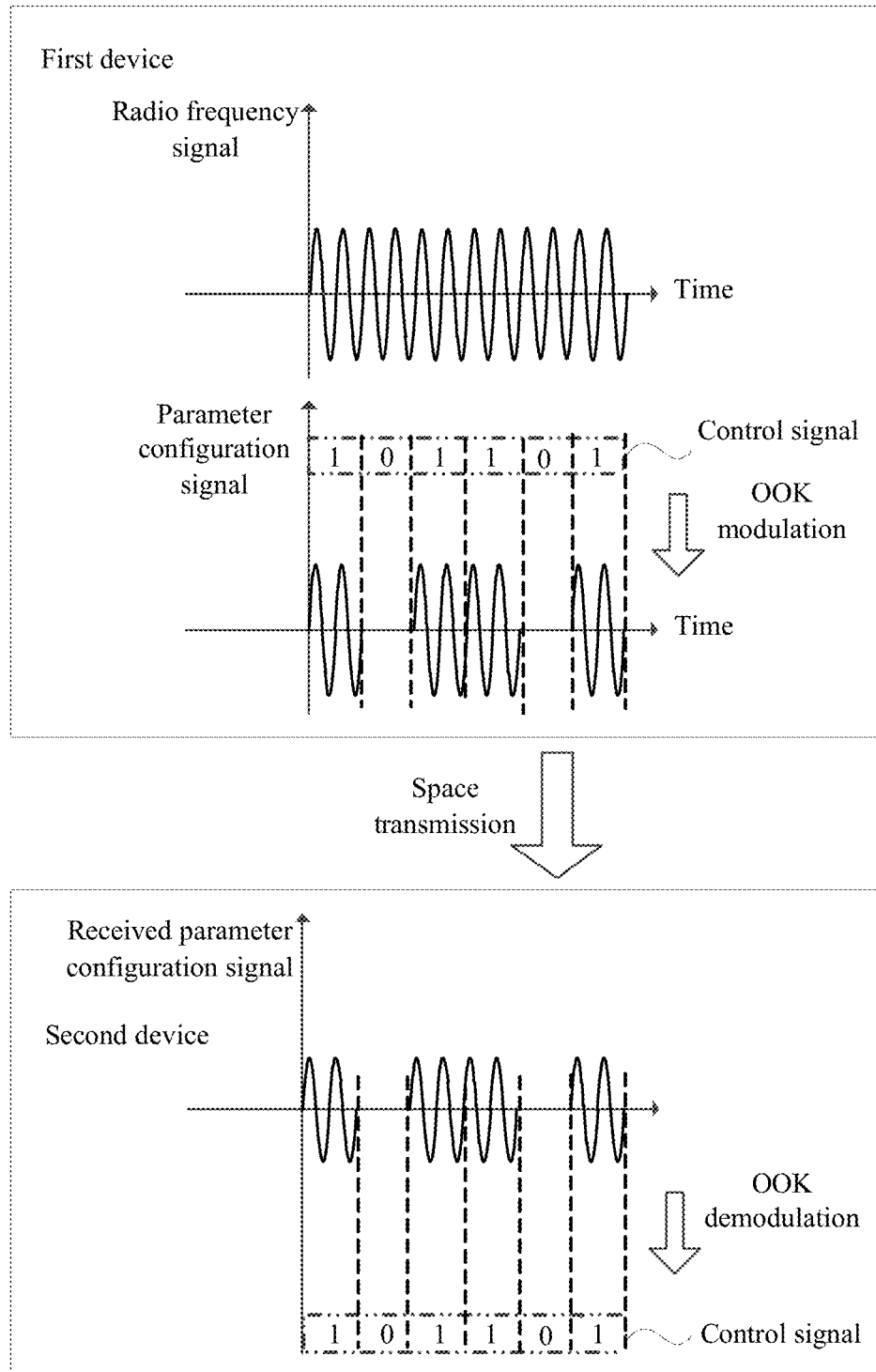
FIG. 4 is a schematic diagram of OOK modulation/demodulation according to the present invention.
Figure 5:
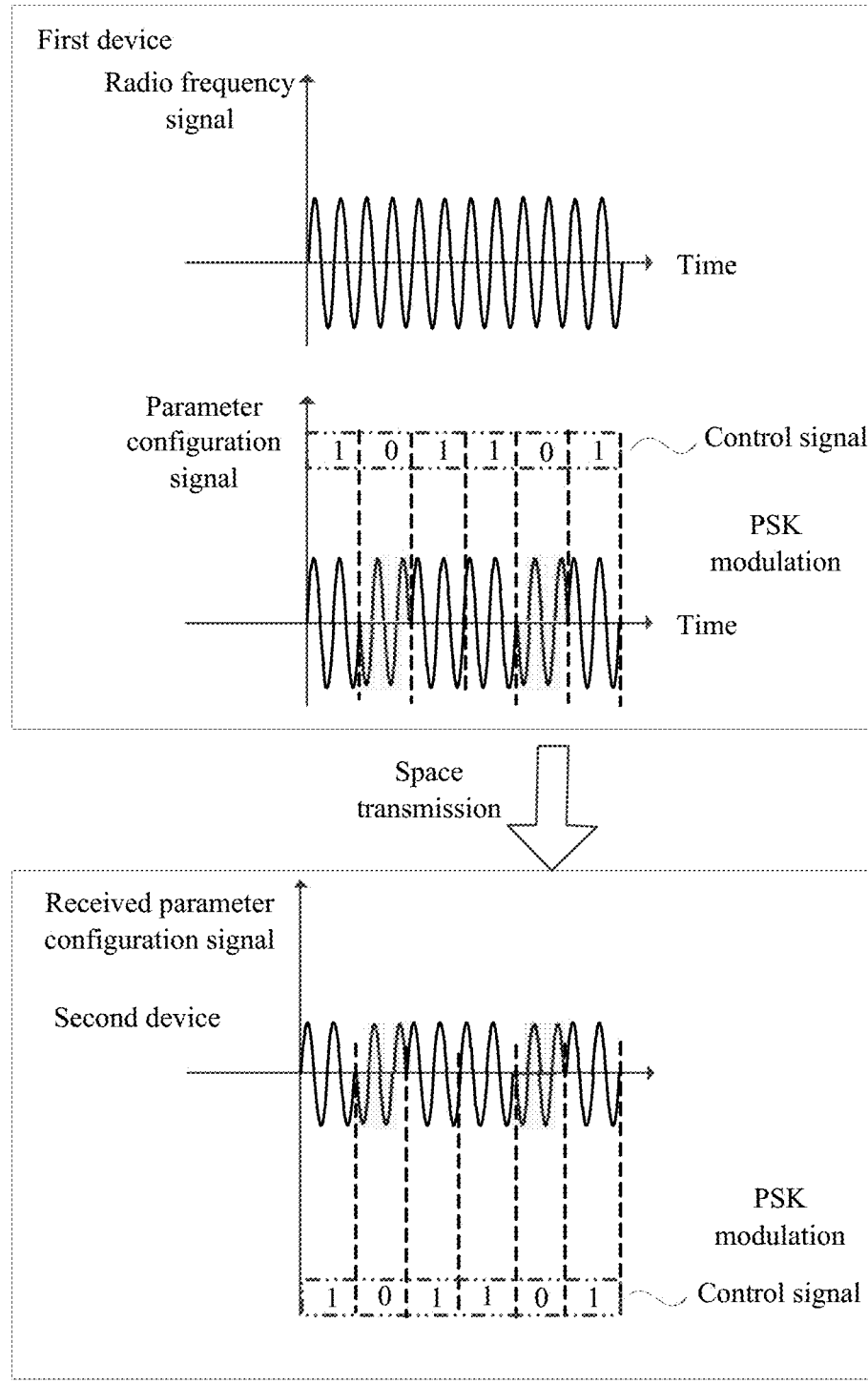
FIG. 5 is a schematic diagram of PSK modulation/demodulation according to the present invention.

To describe clearly modulation that is performed by the first device on the radio frequency signal by using the control signal and a procedure that the second device restores the network management control information by detecting signal strength, this embodiment provides a schematic diagram of OOK modulation. FIG. 4 is a schematic diagram of OOK modulation/demodulation according to the present invention. As shown in FIG. 4, on a first device side, a first device modulates an amplitude of a radio frequency signal by using an OOK scheme, that is, the first device modules the radio frequency signal as an intermittent parameter configuration signal according to a change of a bit stream of a control signal, and sends the intermittent parameter configuration signal out; and on a second device side, a second device detects the received parameter configuration signal, that is, the received signal, to obtain a segment of analog signal whose amplitude changes, and then obtains, according to the OOK scheme principle, the control signal by demodulating the segment of analog signal whose amplitude changes. FIG. 5 is a schematic diagram of PSK modulation/demodulation according to the present invention. As shown in FIG. 5, on a first device side, a first device modulates a phase of a parameter configuration signal by using a PSK scheme, and when a bit of a power control signal is 1, the first device does not change the phase of the parameter configuration signal, that is, the phase is not rotated, while when a bit of a power control signal is 0, the phase of the parameter configuration signal is rotated; and on a second device side, a second device detects the received parameter configuration signal, that is, the received signal, to obtain a segment of analog signal whose phase changes, and then obtains, according to the PSK scheme principle, the power control signal by demodulating the segment of analog signal whose phase is sometimes rotated but sometimes not rotated.

It should be noted that, in practice, after receiving network management control information from the first device, the second device may complete, according to the network management control information, configuration of parameters such as a working frequency of a radio frequency, a working bandwidth of the radio frequency, and a baseband modulation scheme. Optionally, after completing parameter configuration, the second device may send an acknowledgment message to the first device; and after receiving the acknowledgment message, the first device may complete parameter configuration of the first device according to the network management control information and send a service message to the second device. In this way, a communications link between the first device and the second device is established, and the two devices may enter a normal working mode. Certainly, the first device may complete parameter configuration of the first device before sending the network management control information to the second device, where a specific time at which the first device performs a parameter configuration operation is not limited herein. In addition, the second device may not send an acknowledgment message to the first device; after sending the network management control information completely, the first device considers by default that the second device can receive the network management control information, and a communications link has been established normally; and then the first device directly sends a normal service message to the second device, and the two devices enter a normal working state.

In the foregoing embodiment, a first device first receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device, so that the second device obtains, after receiving the parameter configuration signal, the control signal by detecting at least one of an amplitude, or a phase, or an amplitude and a phase of the received signal, and then obtains the network management control information from the first device. In this way, efficiency of configuring a parameter for a microwave device is improved.

Figure 6:
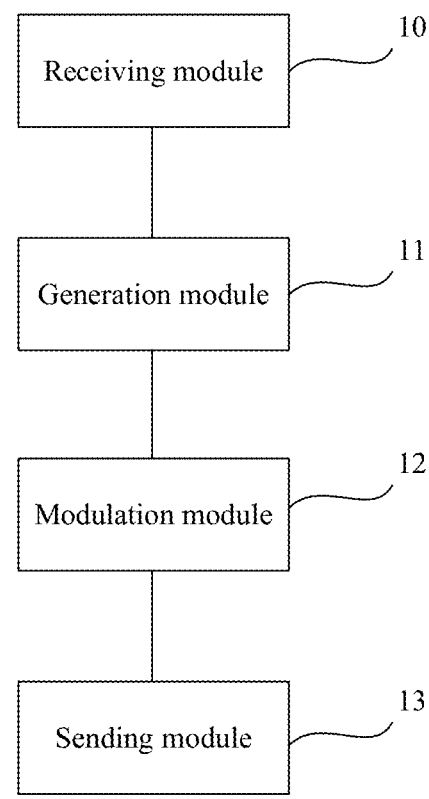
FIG. 6 is a schematic structural diagram of a first device according to Embodiment 4 of the present invention.

FIG. 6 is a schematic structural diagram of a first device according to Embodiment 4 of the present invention. As shown in FIG. 6, the first device includes: a receiving module 10, a generation module 11, a modulation module 12, and a sending module 13.

Specifically, the receiving module 10 is configured to receive network management control information, where the network management control information is microwave parameter configuration information of a second device; the generation module 11 is configured to generate a control signal according to the network management control information, and generate a to-be-sent radio frequency signal after baseband processing and radio frequency processing are performed on preset information; the modulation module 12 is configured to perform modulation on the radio frequency signal by using the control signal, to obtain a parameter configuration signal; and the sending module 13 is configured to send the parameter configuration signal to the second device.

For example, the generation module 11 is specifically configured to add a check code to the network management control information to generate the control signal; and the modulation module 12 is specifically configured to perform adjustment processing on an amplitude and/or a phase of the radio frequency signal according to the control signal, to change power of the radio frequency signal.

Further, the modulation module 12 is specifically configured to adjust an amplitude of the parameter configuration signal according to the control signal by using on-off-keying (OOK) or amplitude shift keying (ASK).

Still further, the modulation module 12 is specifically configured to adjust a phase of the parameter configuration signal according to the control signal by using phase-shift keying PSK.

In the foregoing embodiment, a first device first receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device, so that the second device obtains, after receiving the parameter configuration signal, the control signal by detecting at least one of an amplitude, or a phase, or an amplitude and a phase of the received signal, and then obtains the network management control information from the first device. In this way, efficiency of configuring a parameter for a microwave device is improved.

Figure 7:
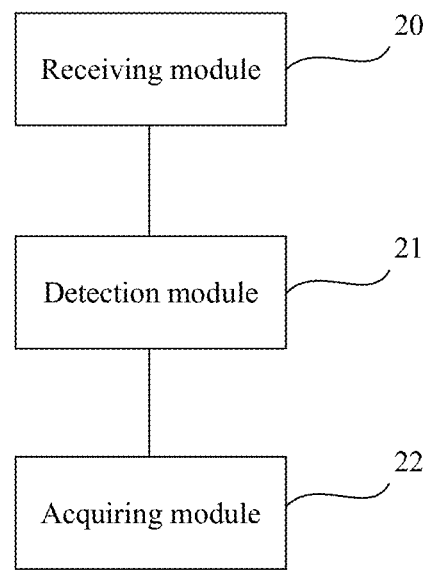
FIG. 7 is a schematic structural diagram of a second device according to Embodiment 5 of the present invention.

FIG. 7 is a schematic structural diagram of a second device according to Embodiment 5 of the present invention.

As shown in FIG. 7, the second device includes: a receiving module 20, a detection module 21, and an acquiring module 22.

Specifically, the receiving module 20 is configured to receive a parameter configuration signal sent by a first device, where the parameter configuration signal is obtained after the first device performs modulation on a radio frequency signal by using a control signal; the detection module 21 is configured to detect at least one of an amplitude and/or a phase of the parameter configuration signal to obtain the control signal corresponding to the parameter configuration signal; and the acquiring module 22 is configured to acquire network management control information corresponding to the control signal, where the network management control information is microwave parameter configuration information of the second device.

For example, the detection module 21 is specifically configured to: detect the amplitude of the parameter configuration signal to obtain a signal strength indication signal, perform sampling and quantization processing on the signal strength indication signal to obtain a first quantization signal, and perform demodulation on an amplitude of the first quantization signal to obtain the control signal.

Further, the detection module 21 is specifically configured to: detect the phase of the parameter configuration signal to obtain a signal phase indication signal, perform sampling and quantization processing on the signal phase indication signal to obtain a second quantization signal, and perform demodulation on a phase of the second quantization signal to obtain the control signal. The acquiring module 22 is specifically configured to perform check code removal processing on the control signal to obtain the network management control information.

Still further, the detection module 21 is specifically configured to perform demodulation on the control signal the amplitude of the first quantization signal by using on-off-keying (OOK) or amplitude shift keying (ASK), to obtain the control signal.

Still further, the detection module 21 is specifically configured to perform demodulation on the phase of the second quantization signal by using phase-shift keying (PSK), to obtain the control signal.

In the foregoing embodiment, a first device first receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device, so that the second device obtains, after receiving the parameter configuration signal, the control signal by detecting at least one of an amplitude, or a phase, or an amplitude and a phase of the received signal, and then obtains the network management control information from the first device. In this way, efficiency of configuring a parameter for a microwave device is improved.

Figure 8:
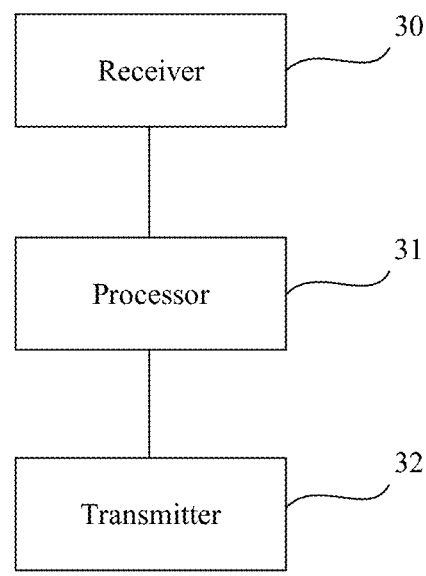
FIG. 8 is a schematic structural diagram of a first device according to Embodiment 6 of the present invention.

FIG. 8 is a schematic structural diagram of a first device according to Embodiment 6 of the present invention. As shown in FIG. 8, the first device includes: a receiver 30, a processor 31, and a transmitter 32.

Specifically, the receiver 30 is configured to receive network management control information, where the network management control information is microwave parameter configuration information of a second device; the processor 31 is configured to generate a control signal according to the network management control information, and generate a to-be-sent radio frequency signal after baseband processing and radio frequency processing are performed on preset information; the processor 31 is further configured to perform modulation on the radio frequency signal by using the control signal, to obtain a parameter configuration signal; and the transmitter 32 is configured to send the parameter configuration signal to the second device.

Further, the processor 31 is specifically configured to add a check code to the network management control information to generate the control signal.

Still further, the processor 31 is specifically configured to perform adjustment processing on an amplitude and/or a phase of the radio frequency signal according to the control signal, to change power of the radio frequency signal.

Still further, the processor 31 is specifically configured to adjust an amplitude of the parameter configuration signal according to the control signal by using on-off-keying (OOK) or amplitude shift keying (ASK).

Still further, the processor 31 is specifically configured to adjust a phase of the parameter configuration signal according to the control signal by using phase-shift keying (PSK).

In the foregoing embodiment, a first device first receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device, so that the second device obtains, after receiving the parameter configuration signal, the control signal by detecting at least one of an amplitude, or a phase, or an amplitude and a phase of the received signal, and then obtains the network management control information from the first device. In this way, efficiency of configuring a parameter for a microwave device is improved.

Figure 9:
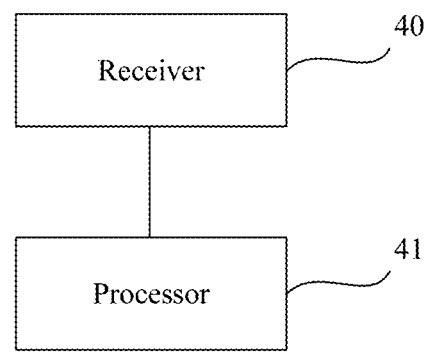
FIG. 9 is a schematic structural diagram of a second device according to Embodiment 7 of the present invention.

FIG. 9 is a schematic structural diagram of a second device according to Embodiment 7 of the present invention. As shown in FIG. 9, the second device includes a receiver 40 and a processor 41.

Specifically, the receiver 40 is configured to receive a parameter configuration signal sent by a first device, where the parameter configuration signal is obtained after the first device performs modulation on a radio frequency signal by using a control signal; the processor 41 is configured to detect at least one of an amplitude and/or a phase of the parameter configuration signal to obtain the control signal corresponding to the parameter configuration signal; and the processor 41 is further configured to acquire network management control information corresponding to the control signal, where the network management control information is microwave parameter configuration information of the second device.

Further, the processor 41 is specifically configured to: detect the amplitude of the parameter configuration signal to obtain a signal strength indication signal, perform sampling and quantization processing on the signal strength indication signal to obtain a first quantization signal, and perform demodulation on an amplitude of the first quantization signal to obtain the control signal.

Still further, the processor 41 is specifically configured to: detect the phase of the parameter configuration signal to obtain a signal phase indication signal, perform sampling and quantization processing on the signal phase indication signal to obtain a second quantization signal, and perform demodulation on a phase of the second quantization signal to obtain the control signal.

Still further, the processor 41 is specifically configured to perform demodulation on the control signal the amplitude of the first quantization signal by using on-off-keying (OOK) or amplitude shift keying (ASK), to obtain the control signal.

Still further, the processor 41 is specifically configured to perform demodulation on the phase of the second quantization signal by using phase-shift keying (PSK), to obtain the control signal.

Still further, the processor 41 is specifically configured to perform check code removal processing on the control signal to obtain the network management control information.

In the foregoing embodiment, a first device first receives network management control information, then generates a control signal according to the network management control information and performs processing on preset information to generate a to-be-sent radio frequency signal, then performs modulation on the radio frequency signal by using the control signal, to obtain a final parameter configuration signal, and then sends the final parameter configuration signal to a second device, so that the second device obtains, after receiving the parameter configuration signal, the control signal by detecting at least one of an amplitude, or a phase, or an amplitude and a phase of the received signal, and then obtains the network management control information from the first device. In this way, efficiency of configuring a parameter for a microwave device is improved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A transmission method for network management control information, the method comprising:
   receiving, by a first device, network management control information, wherein the network management control information is microwave parameter configuration information of a second device;
   generating, by the first device, a control signal according to the network management control information, and generating a to-be-sent radio frequency signal after baseband processing and radio frequency processing are performed on preset information; and
   performing, by the first device, modulation on the radio frequency signal by using the control signal, to obtain a parameter configuration signal, and sending the parameter configuration signal to the second device.

2. The method according to claim 1, wherein generating the control signal according to the network management control information comprises:
   adding, by the first device, a check code to the network management control information to generate the control signal.

3. The method according to claim 1, wherein performing the modulation on the radio frequency signal by using the control signal comprises:
   performing, by the first device, adjustment processing on an amplitude and/or a phase of the radio frequency signal according to the control signal, to change power of the radio frequency signal.

4. The method according to claim 3, wherein performing the adjustment processing on the amplitude of the radio frequency signal according to the control signal comprises:
   adjusting, by the first device, an amplitude of the parameter configuration signal according to the control signal by using on-off-keying (OOK) or amplitude shift keying (ASK).

5. The method according to claim 3, wherein performing the adjustment processing on the phase of the radio frequency signal according to the control signal comprises:
   adjusting, by the first device, a phase of the parameter configuration signal according to the control signal by using phase-shift keying (PSK).

6. A transmission method for network management control information, the method comprising:
   receiving, by a second device, a parameter configuration signal sent by a first device, wherein the parameter configuration signal is obtained after the first device performs modulation on a radio frequency signal by using a control signal;
   detecting, by the second device, at least one of an amplitude and/or a phase of the parameter configuration signal to obtain the control signal corresponding to the parameter configuration signal; and
   acquiring, by the second device, network management control information corresponding to the control signal, wherein the network management control information is microwave parameter configuration information of the second device.

7. The method according to claim 6, wherein detecting the amplitude of the parameter configuration signal to obtain the control signal corresponding to the parameter configuration signal comprises:
   detecting, by the second device, the amplitude of the parameter configuration signal to obtain a signal strength indication signal,
   performing, by the second device, sampling and quantization processing on the signal strength indication signal to obtain a first quantization signal, and
   performing, by the second device, demodulation on an amplitude of the first quantization signal to obtain the control signal; and/or
   detecting, by the second device, a phase of the parameter configuration signal to obtain the control signal corresponding to the parameter configuration signal specifically comprises:
   detecting, by the second device, the phase of the parameter configuration signal to obtain a signal phase indication signal,
   performing, by the second device, sampling and quantization processing on the signal phase indication signal to obtain a second quantization signal, and performing, by the second device, demodulation on a phase of the second quantization signal to obtain the control signal.

8. The method according to claim 7, wherein performing the demodulation on the amplitude of the first quantization signal to obtain the control signal comprises:
performing, by the second device, demodulation on the control signal the amplitude of the first quantization signal by using on-off-keying (OOK) or amplitude shift keying (ASK), to obtain the control signal.

9. The method according to claim 7, wherein performing the demodulation on the phase of the second quantization signal to obtain the control signal comprises:
performing, by the second device, demodulation on the phase of the second quantization signal by using phase-shift keying (PSK), to obtain the control signal.

10. The method according to claim 6, wherein acquiring the network management control information corresponding to the control signal comprises:
performing, by the second device, check code removal processing on the control signal to obtain the network management control information.

11. A microwave device, comprising:
a receiving module, configured to receive network management control information, wherein the network management control information is microwave parameter configuration information of a second device;
a generation module, configured to generate a control signal according to the network management control information, and generate a to-be-sent radio frequency signal after baseband processing and radio frequency processing are performed on preset information;
a modulation module, configured to perform modulation on the radio frequency signal by using the control signal, to obtain a parameter configuration signal; and
a sending module, configured to send the parameter configuration signal to the second device.

12. The device according to claim 11, wherein the generation module is configured to:
add a check code to the network management control information to generate the control signal.

13. The device according to claim 11, wherein the modulation module is configured to:
perform adjustment processing on an amplitude and/or a phase of the radio frequency signal according to the control signal, to change power of the radio frequency signal.

14. The device according to claim 13, wherein the modulation module is configured to:
adjust an amplitude of the parameter configuration signal according to the control signal by using on-off-keying (OOK) or amplitude shift keying (ASK).

15. The device according to claim 13, wherein the modulation module is configured to:
adjust a phase of the parameter configuration signal according to the control signal by using phase-shift keying (PSK).

16. A microwave device, comprising:
a receiving module, configured to receive a parameter configuration signal sent by a first device, wherein the parameter configuration signal is obtained after the first device performs modulation on a radio frequency signal by using a control signal;
a detection module, configured to detect at least one of an amplitude and/or a phase of the parameter configuration signal to obtain the control signal corresponding to the parameter configuration signal; and
an acquiring module, configured to acquire network management control information corresponding to the control signal, wherein the network management control information is microwave parameter configuration information of a second device.

17. The device according to claim 16, wherein the detection module is configured to:
detect the amplitude of the parameter configuration signal to obtain a signal strength indication signal,
perform sampling and quantization processing on the signal strength indication signal to obtain a first quantization signal, and
perform demodulation on an amplitude of the first quantization signal to obtain the control signal; and/or
the detection module is specifically configured to:
detect the phase of the parameter configuration signal to obtain a signal phase indication signal,
perform sampling and quantization processing on the signal phase indication signal to obtain a second quantization signal, and
perform demodulation on a phase of the second quantization signal to obtain the control signal.

18. The device according to claim 17, wherein the detection module is configured to:
perform demodulation on the amplitude of the first quantization signal by using on-off-keying (OOK) or amplitude shift keying (ASK), to obtain the control signal.

19. The device according to claim 17, wherein the detection module is configured to:
perform demodulation on the phase of the second quantization signal by using phase-shift keying (PSK), to obtain the control signal.

20. The device according to claim 16, wherein the acquiring module is configured to:
perform check code removal processing on the control signal to obtain the network management control information.

* * * * *